(12) United States Patent
Li et al.

(10) Patent No.: US 12,363,209 B2
(45) Date of Patent: Jul. 15, 2025

(54) RADIO ACCESS NETWORK (RAN) ARCHITECTURE

(71) Applicant: Telefonaktiebolaget LM Ericsson (publ), Stockholm (SE)

(72) Inventors: Wubin Li, Kirkland (CA); Amine Boukhtouta, Laval (CA); Daniel Migault, Montreal (CA); Stere Preda, Longueuil (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 329 days.

(21) Appl. No.: 17/920,225

(22) PCT Filed: Apr. 22, 2020

(86) PCT No.: PCT/IB2020/053829
§ 371 (c)(1),
(2) Date: Oct. 20, 2022

(87) PCT Pub. No.: WO2021/214520
PCT Pub. Date: Oct. 28, 2021

(65) Prior Publication Data
US 2023/0164246 A1    May 25, 2023

(51) Int. Cl.
*H04W 12/03* (2021.01)
*H04L 69/22* (2022.01)
*H04W 40/02* (2009.01)

(52) U.S. Cl.
CPC ............ *H04L 69/22* (2013.01); *H04W 12/03* (2021.01); *H04W 40/02* (2013.01)

(58) Field of Classification Search
CPC ..... H04L 69/22; H04L 63/0435; H04L 45/34; H04L 45/306; H04W 12/03; H04W 40/02
See application file for complete search history.

(56) References Cited

U.S. PATENT DOCUMENTS 10,218,593 B2 *   2/2019   Pignataro ............... H04L 67/025
RE48,131 E *      7/2020   Pignataro ............... H04L 67/564
(Continued)

FOREIGN PATENT DOCUMENTS

CN        103069784 A      4/2013
CN        107872392 A      4/2018
(Continued)

OTHER PUBLICATIONS

International Search Report and Written Opinion issued in International Application No. PCT/IB2020/053829 dated Sep. 23, 2020 (16 pages).

(Continued)

*Primary Examiner* — Lakeram Jangbahadur
(74) *Attorney, Agent, or Firm* — Weisberg I.P. Law, P.A.

(57) ABSTRACT

A method for steering an original packet transmitted by a UE. The method includes receiving a first packet, wherein the first packet encapsulates the original packet. The method also includes extracting networking information (e.g., IP source, IP destination, tunnel identifier) from the first packet. The method also includes generating an SFC header (e.g., an NSH header), wherein the SFC header comprises: i) an SPI that identifies a service path and ii) metadata, wherein the metadata comprises the networking information extracted from the first packet. The method also includes generating a second packet comprising the SFC header and the original packet. The method also includes providing the second packet to an SFF that is configured to select a service path based on the SPI included in the SFC header of the second packet and forward the second packet based on the selected service path.

8 Claims, 20 Drawing Sheets

(56) References Cited

U.S. PATENT DOCUMENTS

| | | | |
|---|---|---|---|
| 2017/0208011 A1 | 7/2017 | Bosch et al. | |
| 2017/0264537 A1 | 9/2017 | Patil et al. | |
| 2018/0091420 A1* | 3/2018 | Drake | H04L 67/10 |
| 2018/0198643 A1 | 7/2018 | Ao et al. | |
| 2018/0205643 A1* | 7/2018 | Patil | H04L 45/566 |
| 2019/0138356 A1 | 5/2019 | Bernat et al. | |
| 2019/0158997 A1 | 5/2019 | Starsinic et al. | |
| 2019/0379599 A1* | 12/2019 | Siracusano | H04L 41/342 |

FOREIGN PATENT DOCUMENTS

| | | | |
|---|---|---|---|
| CN | 108886500 A | 11/2018 | |
| EP | 3456024 B1 * | 2/2020 | H04L 45/306 |

OTHER PUBLICATIONS

Chinese Office Action with English language machine translation dated Nov. 8, 2024 for Patent Application No. 202080100084.X, consisting of 13 pages.

EPO Communication dated Dec. 3, 2024 for Patent Application No. 20721808.2, consisting of 7 pages.

Rosen, E. et al.; The BGP Tunnel Encapsulation Attribute draft-ietf-idr-tunnel-encaps-02; IDR Working Group; Internet-Draft; May 31, 2016, consisting of 44 pages.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|       Metadata Class         |      Type     |U|    Length    |
+-+-+-+-+-+-+-+-+-+-+-+-+-+-+-+-+-+-+-+-+-+-+-+-+-+-+-+-+-+-+-+-+
|                       Variable-Length Metadata                |
+-+-+-+-+-+-+-+-+-+-+-+-+-+-+-+-+-+-+-+-+-+-+-+-+-+-+-+-+-+-+-+-+
```

FIG. 13

RADIO ACCESS NETWORK (RAN) ARCHITECTURE

CROSS REFERENCE TO RELATED APPLICATIONS

This application is a 35 U.S.C. § 371 National Stage of International Patent Application No. PCT/IB2020/053829, filed 2020 Apr. 22.

TECHNICAL FIELD

Disclosed are embodiments related to a radio access network (RAN) architecture.

BACKGROUND

FIG. 1 illustrates a Third-Generation Partnership Project (3GPP) RAN architecture. As shown in FIG. 1, a user equipment (UE) 102 is operable to communicate with a host 112 (e.g., a server) connected to a network 110 (e.g., the Internet) via 3GPP functions, which may include a transmission and reception point (TRP) 104, a baseband processing unit (BPU) 106, a RAN function 108 (e.g., a component of a base station), and a user plane function (UPF) 109, which is part of a core network 111. The 3GPP architecture specifies the relation BPUs and RAN functions, as well as between the RAN functions and core network functions (e.g., UPFs). Upon receiving an Internet Protocol (IP) protocol data unit (PDU), the RAN function 108 identifies the context associated to the IP PDU based on the IP addresses as well as the General Packet Radio Service (GPRS) Tunneling Protocol (GTP) tunnel ID. As a result, the IP communications defines the context. FIG. 2 illustrates the 3GPP protocol stacks implemented by UE 102, BPU 106, RAN function 108, and UPF 109. As used herein, the term "packet" means PDU.

SUMMARY

While there are some efforts to virtualize the 3GPP RAN architecture, a fundamental challenge is that the 3GPP RAN architecture relies heavily on the infrastructure. More specifically, communications are not performed with a service perspective, but instead the architecture defines how a packet is steered from one IP address to another IP address. In this case, IP addresses, as well as other IP networking communications protocols (e.g., the GTP), are used to carry the necessary information associated to the packet. Defining packet steering from IP points to IP points makes it difficult to virtualize the RAN architecture, typically over a "public" cloud. At most it enables to replace end points by virtual machines (VMs). But this approach does not fully leverage the power of virtualization.

Containerization is a form of virtualization. It is advantageous for the RAN as well as other elements of the 5G architecture to take the full advantage of container technology. Containers have an ephemeral nature. Orchestration systems handle easily failing containers by triggering coexisting containers without a noticeable overhead. In addition, roll back of failing new container versions is easier. This is supported by a daemon that manages the segregation between containers, meanwhile leveraging workloads to the kernel. Containers are also shifting big monolithic applications towards a functional chaining model, which conserves applications execution semantics, meanwhile, instantiating granular functions redundantly and on demand. Containers can be integrated with orchestration systems (e.g., Kubernetes or Mesosphere), which can be configured to, for example, scale out or scale in container images and remove the container images upon the presence of certain traffic patterns or traffic demand.

A purpose of virtualizing BPU, RAN and UPF is to take advantage of the container technology. This includes designing these functions with a service perspective, i.e. independently from the infrastructure which is being deployed. While BPU, RAN and UPF may be containerized, they should be able to coexist with services that have not been containerized yet and, as such, must remain compatible with the interfaces defined by 3GPP. This disclosure describes an additional network function that ensures the portability of containers with non-containerized network functions. It also describes an infrastructure that shifts the context from transport and routing layers to the application layer. In one embodiment, the Network Service Header (NSH) (see Request For Comments (RFC) 8300) is leveraged to insert service function paths between different boxes, in addition, having a translation function that allows to change transparently from NSH to 3GPP and vice versa. An advantage of using NSH is that it is transport agnostic and can be carried by transport protocols.

Accordingly, in one aspect there is provided a method for steering an original packet transmitted by a UE. The method includes receiving a first packet, wherein the first packet encapsulates the original packet, the first packet comprising networking information (e.g., IP source, IP destination, tunnel identifier). The method also includes extracting the networking information from the first packet. The method also includes generating a service function chaining, SFC, header (e.g., an NSH header), wherein the SFC header comprises a service path identifier, SPI, that identifies a service path and metadata, wherein the metadata comprises the networking information extracted from the first packet. The method also includes generating a second packet comprising the SFC header and the original packet. The method also includes providing the second packet to a service forwarding function, SFF, that is configured to select a service path based on the SPI included in the SFC header of the second packet and forward the second packet based on the selected service path.

An advantage of the embodiments disclosed herein is that they enable a service provider to virtualize a RAN and take full advantage of container technology.

BRIEF DESCRIPTION OF THE DRAWINGS

The accompanying drawings, which are incorporated herein and form part of the specification, illustrate various embodiments.

FIG. 13 shows the format of NSH optional variable-length (VL) metadata.

DETAILED DESCRIPTION

Architecture Overview

A service approach for the traffic being steered between BPU, RAN, and UPF is described. In order to remain close to the 3GPP architecture, a hierarchical service architecture is considered. BPU, RAN, and UPF are considered as services, however, each of them can be subdivided into an organization of micro services.

It is expected that a cloud provider provides enough means to scale each service by scaling out appropriately the micro services. The placement and organization of each service is left to the operator.

Figure 1:
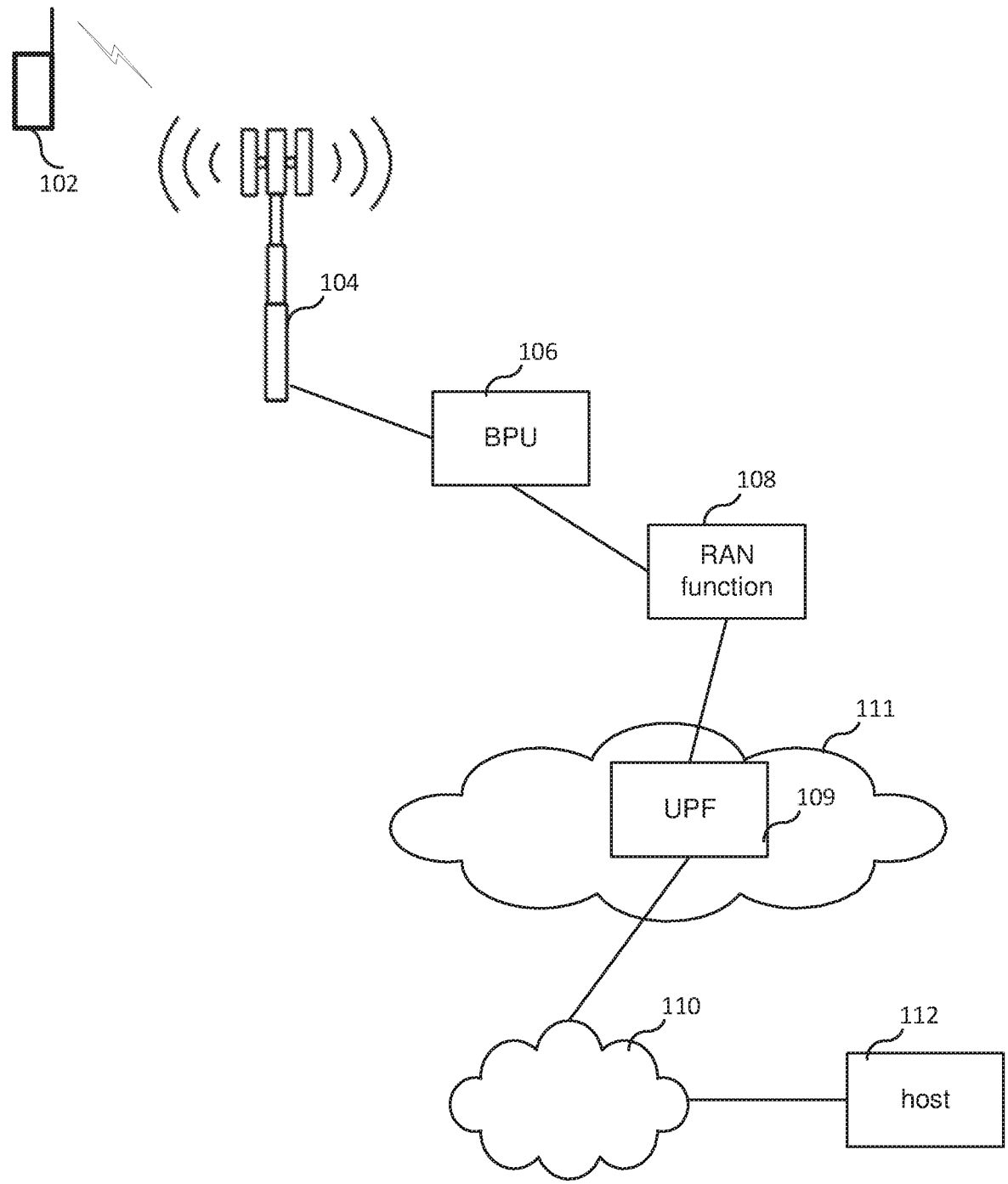
FIG. 1 illustrates a communication system according to some embodiments.
Figure 2:
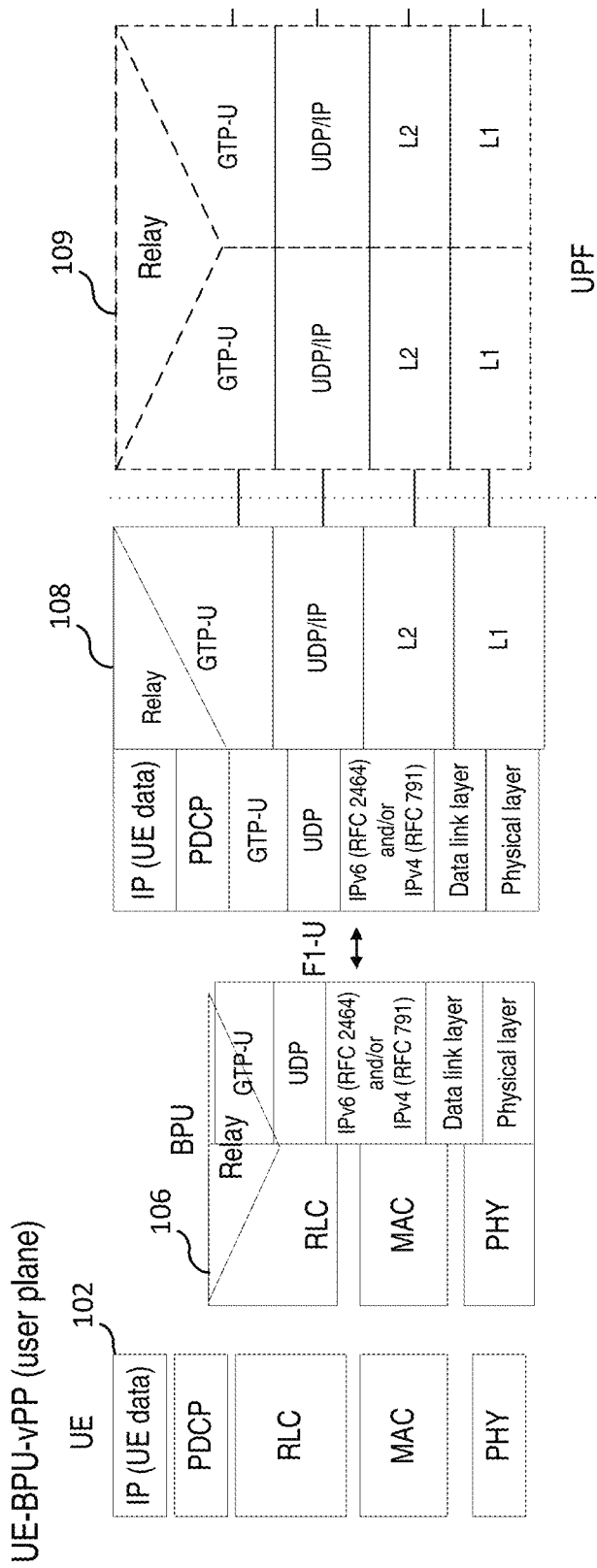
FIG. 2 illustrates 3GPP protocol stacks.
Figure 3:
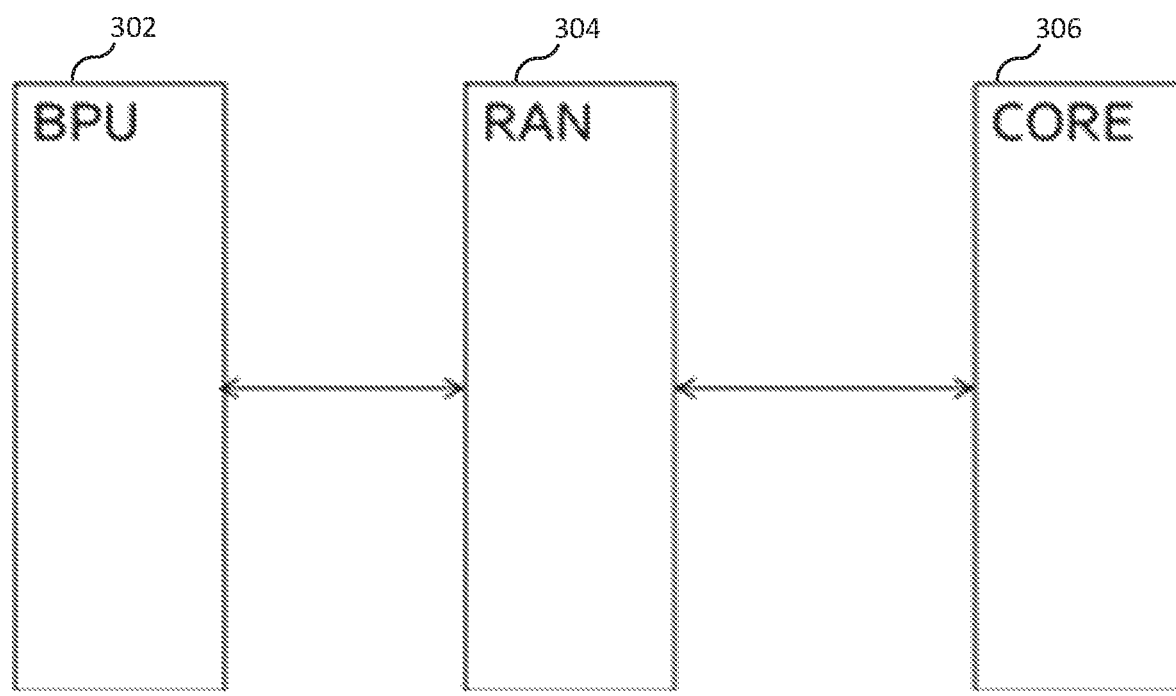
FIG. 3 illustrates a virtualized RAN.
Figure 4:
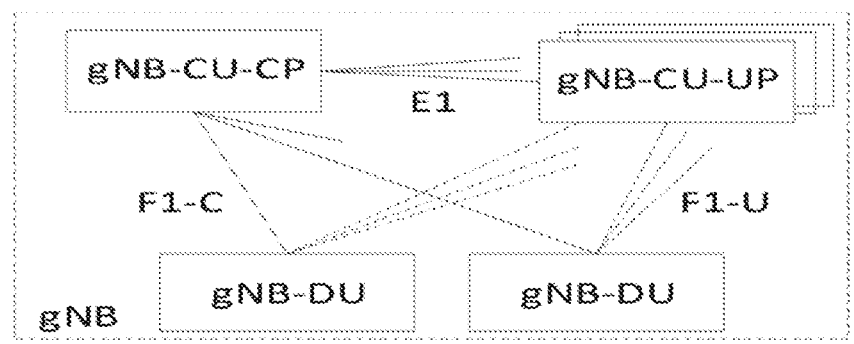
FIG. 4 illustrates a service organization.
Figure 5:
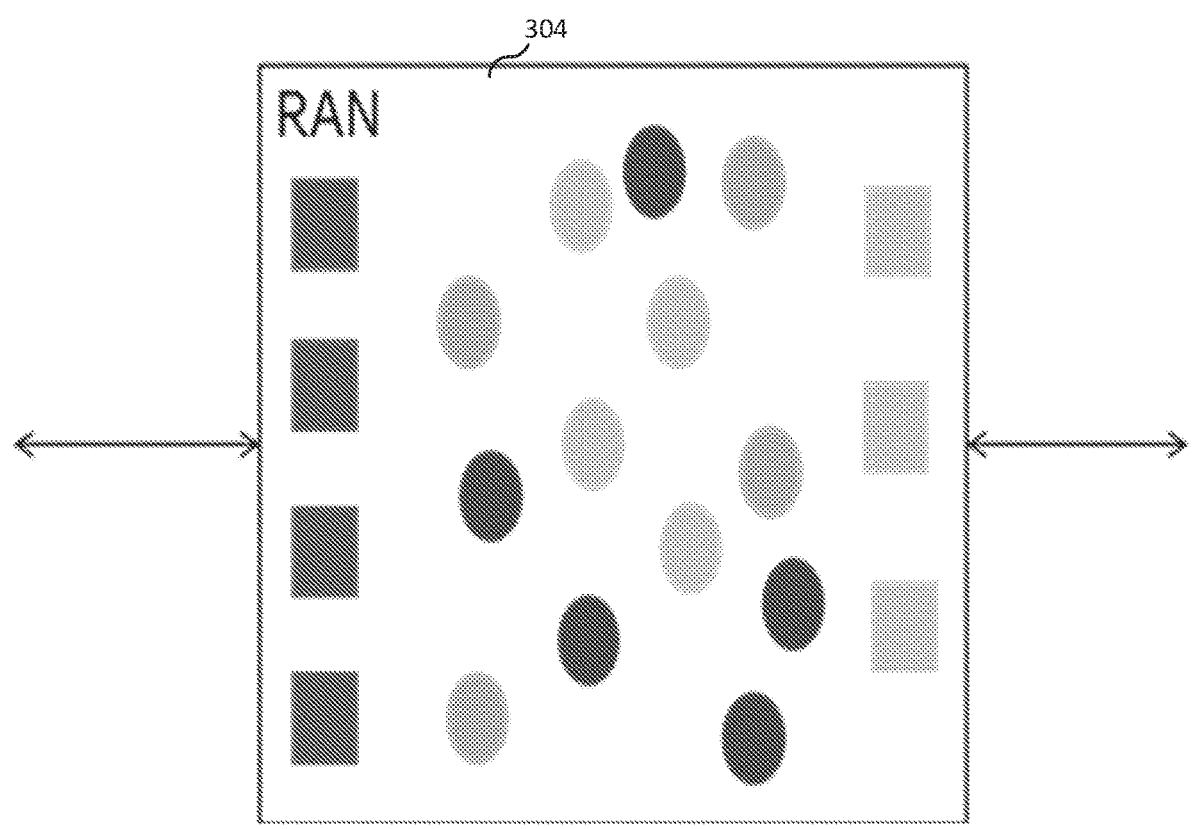
FIG. 5 illustrates an initial organization of a service.
Figure 6:
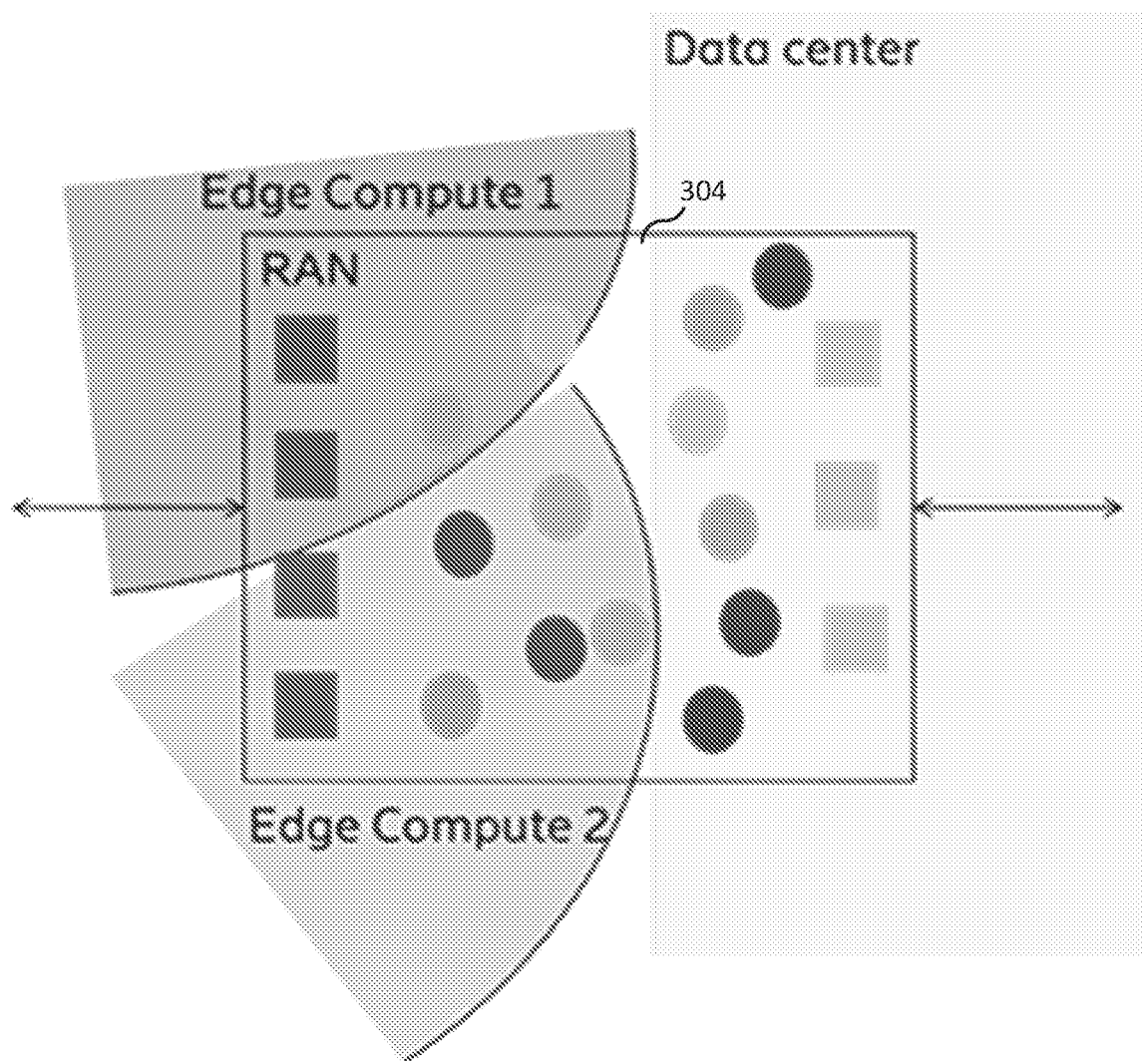
FIG. 6 illustrates an example infrastructure.

A high-level illustration of a virtualized RAN (vRAN) on a containerized environment is as represented in FIG. 3, which shows a BPU function 302, which may be a component of a 5G base station (gNB) (e.g., a gNB-DU), connected to a RAN function 304 (e.g., gNB-CU), which is connected to a core network function 306. An initial organization of the service is represented in FIG. 5. The organization of micro-services into services is transparent to the service organization. The service organization is defined by 3GPP (see FIG. 4), while the micro service organization is implementation dependent. The deployment of the service typically over various types of infrastructure is left to the operator of the service via the API and subscription provided to the cloud infrastructure provider (see FIG. 6 for an example). In one embodiment, the facilities are provided by Kubernetes (K8s). The following roles are defined: i) Definition of the 5G services (3GPP); ii) Definition of the service architecture, and iii) Definition of the deployment (Operator/Cloud infrastructure provider).

The architecture overview depicted by FIG. 3 is a chain of services, and packets are steered from one service to the next. There are various mechanisms that can be used to perform service function chains. NSH is one example. 3GPP defining network interfaces provides another way to do steering. These are different implementations of the same concept. The current implementation defined by 3GPP is bound to the infrastructure and that is something that is no longer in-line with the current Information Technology (IT) industry best practices.

One way to define service function chaining is that a traffic flow is being forwarded from one function (service) to another one. The packet is carried with associated metadata. Packet and metadata are independent from the infrastructure. In this case, in order to provide a non-3GPP perspective, the service function chaining will be described using SFC and NSH and a high level vision is depicted in FIG. 7.

Figure 7:
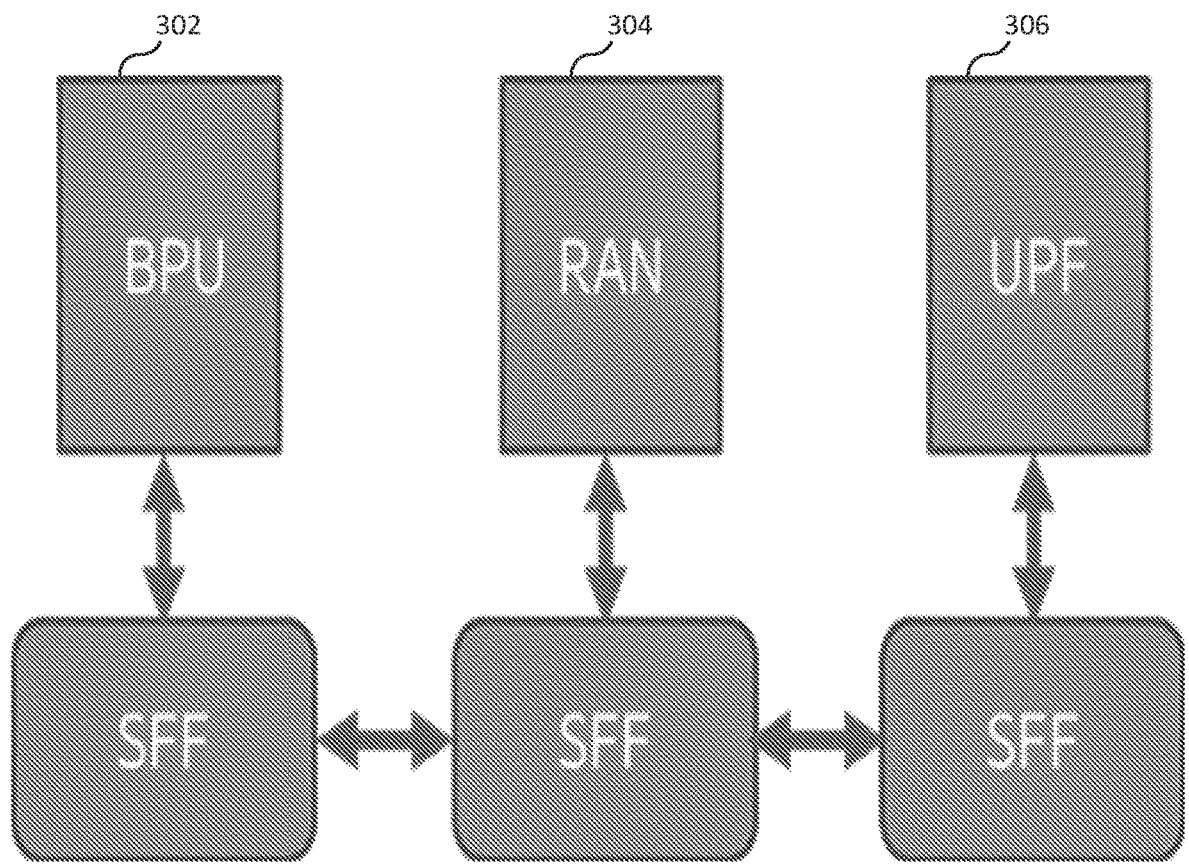
FIG. 7 illustrates service function chains according to an embodiment.
Figure 8:
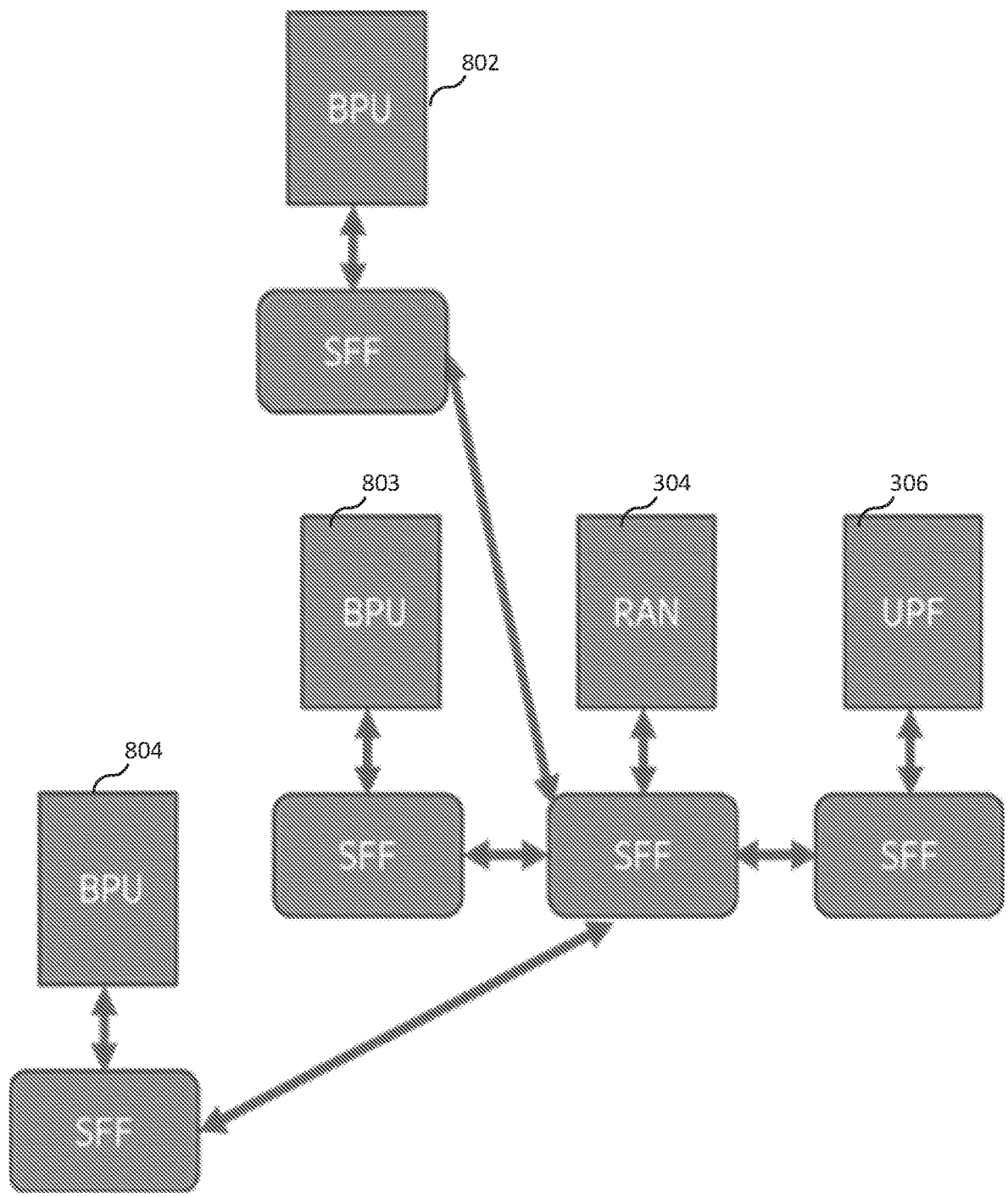
FIG. 8 illustrates service function chains according to an embodiment.

The architecture shown in FIG. 7 minimizes the impact with the definition of a single chain for the full deployment. FIG. 8 provides another approach. This approach is closer to the 3GPP approach, where multiple chains are defined between BPU and RAN service. More specifically, instead of considering BPU as one service, BPU is created via three different services 802, 803, and 804.

While steering traffic from one service to another may require some interaction with the underlying infrastructure, the ability of steering a packet with its associated metadata reduces these interaction and lets the cloud provider use its (e.g., proprietary) way to steer traffic from one service to the other or lets the common way between two providers. In that sense, the techniques disclosed herein are not relying on the infrastructure.

The choice between the approach of FIG. 7 or the approach of FIG. 8 will likely be based on balancing the capability of the infrastructure to place appropriately the containers to the right location versus manual resource provisioning. In the first case, the K8s or any other platform is responsible for providing the best service. In the other cases, this is performed via an architecture design. One may target the first approach where, efficiency is left to the platform via automated and dynamic resource allocation, while the second approach is more conservative.

Service RAN Architecture

The service RAN architecture is divided into two chains: uplink (UL) and downlink (DL). The reason for splitting these two chains is that downlink and uplink traffic have different pattern, and may or may not be related as it depends on the usage. A phone conversation will have similar UL and DL pattern—unless one is really more talkative in which case this is not a conversation). On the other hand a video download will have no uplink traffic while having a large amount of downlink traffic.

In uplink, one of the main functions of the RAN is bearer management and over-the-air protection with Packet Data Convergence Protocol (PDCP) packets which are decrypted and forwarded to the UPF functions. This is performed by the PDCP "D" function. Similarly, the downlink encrypts the packets coming from the UPF to the UE.

For both cases, encryption or decryption is performed using a symmetric key (with the UE) and the key or key ID is provided by an M2Key function. Typically, this function performs a binding between metadata provided in the NSH header to the local key index or key. In other words, it is ensured that there is a transformation/binding from NSH metadata to a RAN (bearer) context.

In order to remain compatible with the 3GPP 5G interfaces as well as to enable platform efficient transport protocols, a function designated a "3GPP2NSH" 902 (see FIG. 9) translates the way 3GPP associates a data packet to a RAN context into a more appropriated way for the platform. The input defined by 3GPP are: BPU IP address; RAN IP address; and GTP ID. These parameters are used by the RAN to associate the PDCP packet to a context and more specifically its key.

The 3GPP2NSH function 904 may operate in various ways. One typical implementation is to translate the information provided by the network stack as metadata. In other words, the BPU IP addresses, RAN IP addresses, and GTP-ID are carried as type-length-value (TLV) metadata in an NSH header. This provides a high degree of compatibility with the 3GPP architecture. Another implementation may simply include a Context ID. In another embodiment, a context ID associated to a path ID is used to identify a context.

In some embodiments, The 3GPP2NSH function 904 terminates the 3GPP tunnel (e.g., a GTP user plane (GTP-U) tunnel), which may be implemented by an entity different from a typical NR/F1 entity. An NSH23GPP function 906 (see FIG. 9) does the reverse function.

Description of the Chains

This section describes example service chains. This section bases its description on the use of a Service Function Chaining (SFC) architecture (see e.g., RFC 7665) and NSH. Other technologies, including proprietary technologies, may also be used. While each RAN provider may use a different platform and specific technologies, it remains advantageous that these technologies remain compatible with SFC/NSH which is the IETF standard for service function chaining in order to inter-operate with other vendors and become attractive for an ISP. The interoperability is primarily required at the application layer with the BPU and the UPF. Currently this interoperability is defined by 3GPP but it does not properly fit the requirements for containerization of the infrastructures.

This disclosure defines a way for a containerized RAN to interoperate with the BPU and UPF using interfaces defined by the 3GPP. The main advantage is that the RAN will be able to be containerized and benefit from the advanced deployment or technologies developed for IT, while remaining compliant with the 3gpp standards. As a result, an ISP would be able to use an efficient, flexible RAN implementation that meets the requirement of edge computing while being able to inter-operate with the other components (BPU, UPF). However, it is also envisioned that in the long term, all components (BPU, UFP) become containerized and benefit from the same advantage as the RAN described in this document benefits. The use of a standard protocol would in the long term enable a common protocol (SFC, NSH) across the BPU, RAN and UPF that would remove the need for a translation from/to the currently defined 3GPP. It is expected that the first deployment would use such interface as a proprietary interface before it becomes standardized by the 3GPP.

Figure 9:
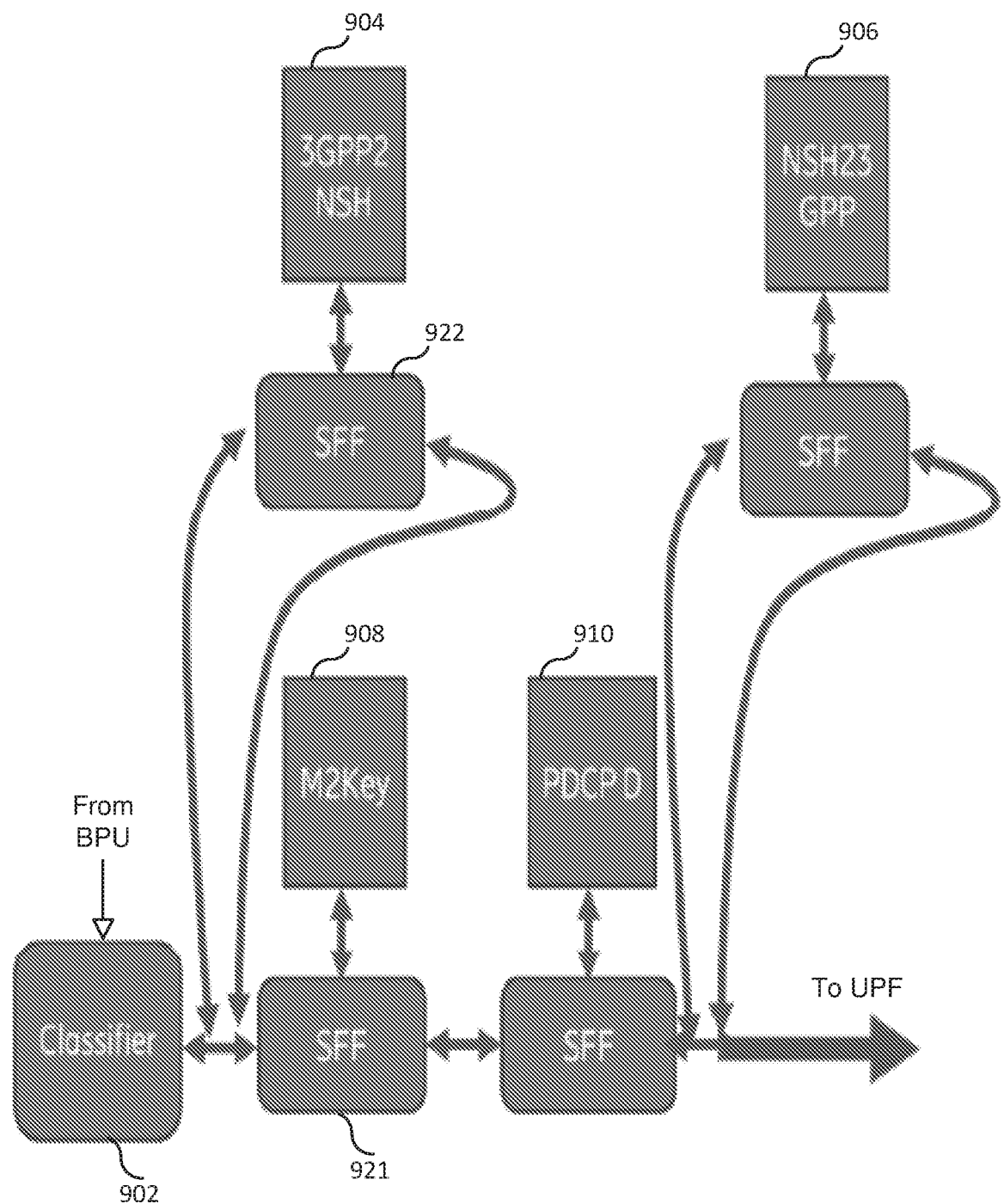
FIG. 9 illustrates service function chains according to an embodiment.

FIG. 9 illustrates an UL SFC (i.e., an SFC for the uplink traffic). As shown in FIG. 9, the following entities are employed: a classifier 902; 3GPP2NSH 904, NSH23GPP 906, M2Key 908, PDCP-D 910. Uplink traffic is the traffic steered through BPU, RAN and UPF, in this order.

Inbound traffic from a UE (e.g., PDCP packets transmitted by the UE) arrives at classifier 902. The classifier 902 takes the incoming packets and, based on rules, steers each packet to the appropriate function. For example, the classifier may have a rule that instructs classifier 902 to forward to a particular SFC any packet that comprises a GTP-U payload that carries a PDCP packet.

3GPP2NSH 904 is a translation function that converts a packet using the standard 3GPP format into a new format. The new format, in this example, is based on NSH. It is expected that 3GPP may itself use the NSH format for radio packets, and this function may not be used anymore. But until that time this function is used as the interconnection with BPU that conforms to the current 3GPP format.

NSH23GPP 906 is a translation function that converts the NSH format to the 3GPP format. Similarly to 3GPP2NSH, it is expected in the long term the RAN will be able to interconnect directly using NSH format, without the need of packet format conversion.

M2Key 908 is a function that is able to obtain (e.g., retrieve) a key (or key index) based on information from the received NSH packet. The key (or a key index) is added to the NSH packet and transmitted to the PDCP-D function.

PDCP-D 910 is a PDCP decryption function, which, given the correct key, is able to decrypt the PDCP packet transmitted by the UE and forward the decrypted packet to the UPF.

In one embodiment, classifier 902 steers packets to 3GPP2NSH 904. The purpose of this chain is to translate an incoming 3GPP packet into a new packet (e.g., NSH in this embodiment).

In another embodiments, classifier 902 steers packets to M2Key 908, which then steers packets to PDCP-D 910. In this embodiment it may be the case that the packet received at classifier 902 is already and NSH packet, and therefore, no translation is needed.

Figure 10:
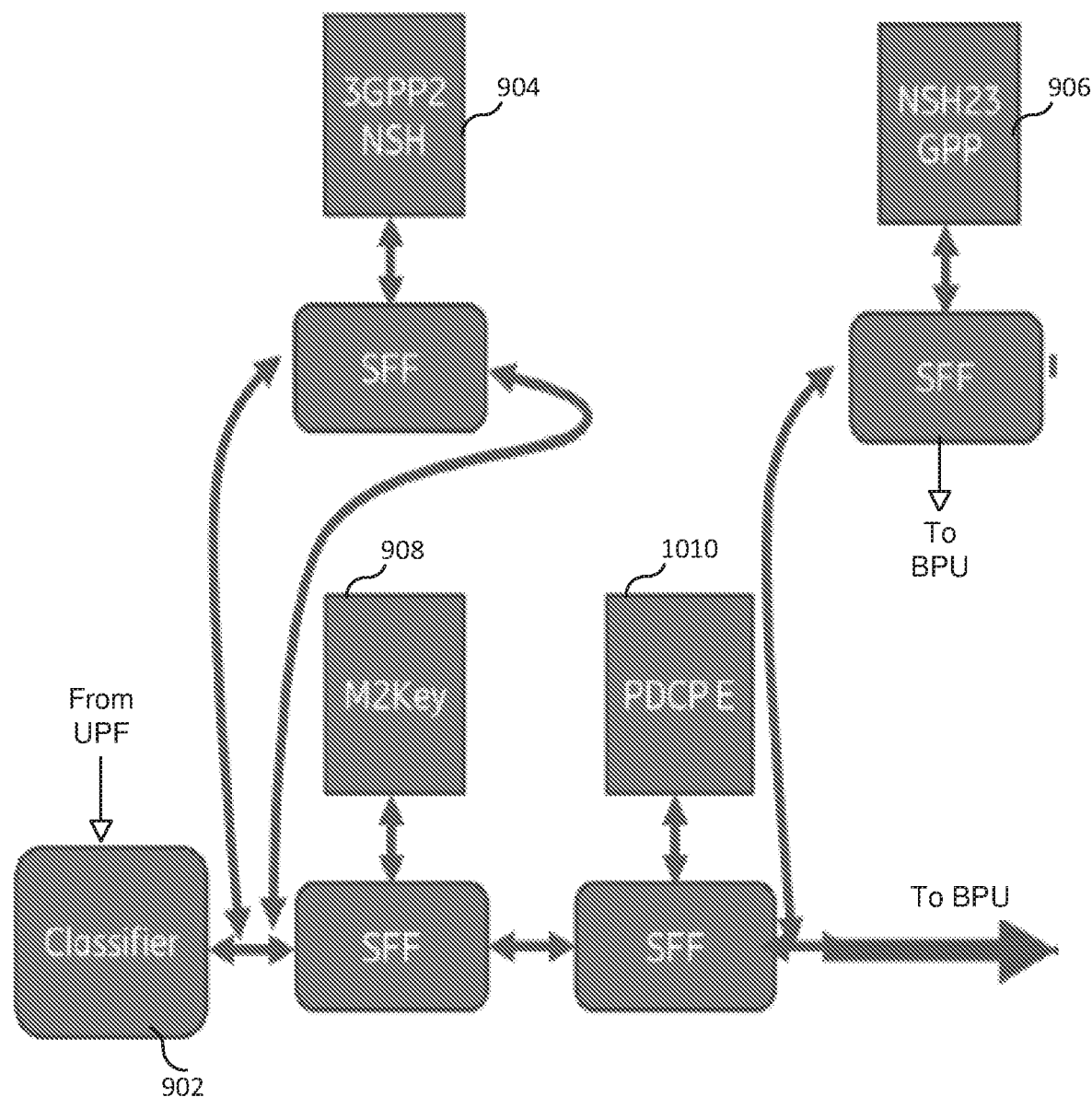
FIG. 10 illustrates service function chains according to an embodiment.

FIG. 10 illustrates an DL SFC (i.e., an SFC for the downlink traffic). As shown in FIG. 10, the following entities are employed: classifier 902; 3GPP2NSH 904, NSH23GPP 906, M2Key 908, PDCP-E 1010. Thus, the difference between the uplink and the downlink is that the PDCP-D 910 is replaced with the PDCP-E 1010, which performs encryption of packets received from the UPF. Downlink traffic is steered from UPF, RAN and BPU, in this order.

The 3GPP2NSH Function

The 3GPP2NSH function 904 can be instantiated for uplink and/or downlink traffic. For uplink traffic, The 3GPP2NSH function 904 is located at the entry point of the RAN receiving packets from the BPU (see FIG. 9). For downlink traffic, The 3GPP2NSH function 904 is located at the entry point of the RAN receiving packets from the UPF (see FIG. 10).

Figure 11:
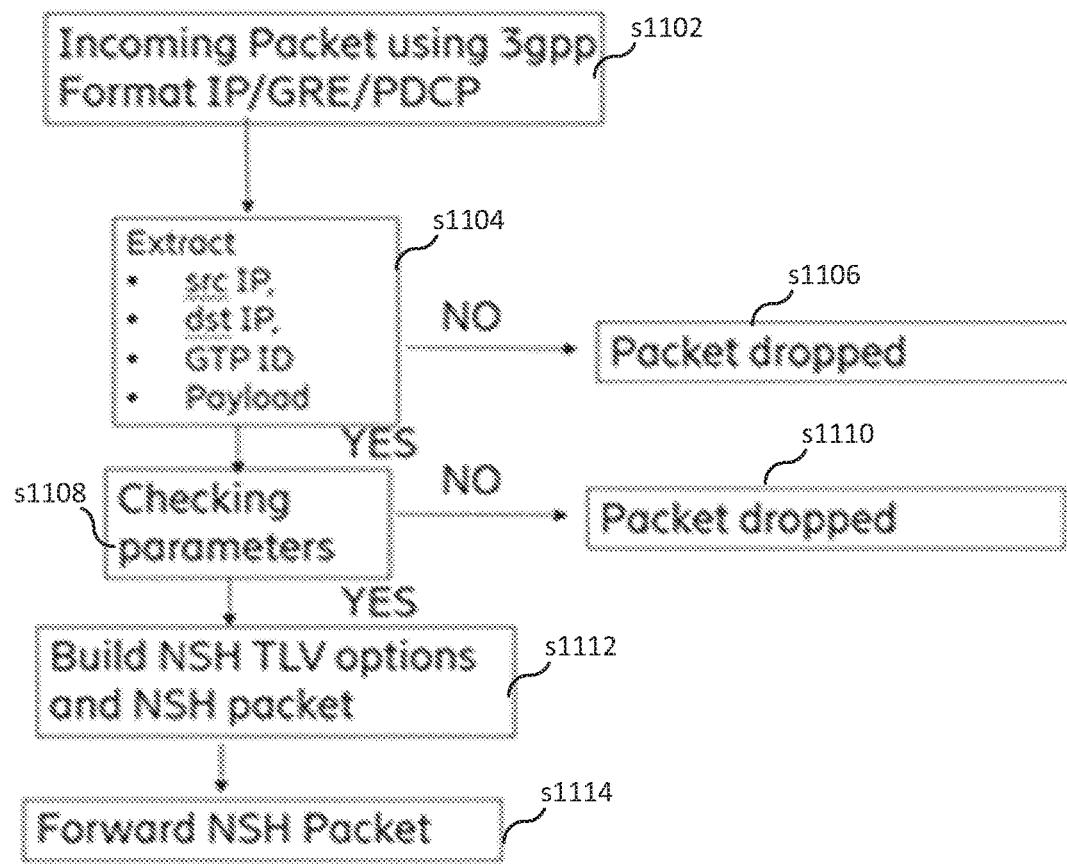
FIG. 11 is a flowchart illustrating a process according to some embodiments.

In one embodiment, 3GPP2NSH performs process 1100 (see FIG. 11).

In step s1102, 3GPP2NSH receives an UL packet. In some embodiments, the UL packet is an IP packet generated by the BPU, where the IP packet contains a GTP header (e.g., a GTP-U header) generated by the BPU and a PDCP packet transmitted by the UE. More specifically, in some embodiments, IP packet contains a User Datagram Protocol (UDP) packet, where the payload of the UDP packet comprises the GTP header followed by the PDCP packet.

In step s1104, 3GPP2NSH extracts networking information from the packet. In embodiments where the UL packet is an IP packet, the extracted network information may include: the IP packet's IP source address (which identifies BPU that generated the packet), the packet's IP destination address (this identifies the RAN), and the GTP Tunnel ID (TEID) that identifies the GTP tunnel relating to the UE radio bearer. In case one of these pieces of information is not found, the packet may be dropped (step s1106).

After extracting the networking information, The 3GPP2NSH function 904 may validate the networking information (e.g., as a sanity and forgery check) (step s1108). If values are different from expected values, the packet may be dropped (step s1110). For example, if the IP source address and/or the IP destination address are not within a particular range of IP addresses, then the networking information is not validated and the packet may be dropped. As another example, for uplink traffic, the source IP address must correspond to the expected BPU and the destination IP address must correspond to the RAN entry point (e.g., a locator of the Classifier 902). For both uplink and downlink traffic, the TEID must correspond to an existing value in a set of TEIDs (stored at BPU or RAN level) observed during the establishment of UEs radio bearers. For downlink traffic, the IP address source corresponds to the IP address of the UPF, the destination IP address corresponds to the RAN entry point.

Other parameters from 3GPP domain could be considered as input to the 3GPP2NSH function. For example, an indication that the current UE radio bearer is in Acknowledge or Unacknowledge Mode could be considered, resulting in an eventual different processing of the virtual packets, on different chains. For downlink traffic, such an indication of AM bearer could be useful for the PDCP-E function, which could implement a buffering of corresponding packets while expecting indications of successful packet delivery from BPU.

Assuming the packet has been validated, The 3GPP2NSH function 904 then generates an NSH packet where the NSH header of the NSH packet contains at least some of the extracted networking information (step s1112). For example, the extracted values (e.g., source address, destination address, TEID) are included in an NSH header as metadata using the TLV format. In one embodiment, one metadata element may encapsulate all of the extracted networking information, but in other embodiments, separate metadata elements may be used to encapsulate each piece of networking information. The payload of the NSH packet contains at least the packet that was transmitted by the UE (e.g., the PDCP packet), but in some embodiments, the payload includes the packet transmitted by the BPU (e.g., the IP packet or just the GTP packet). After generating the NSH packet, The 3GPP2NSH function 904 forwards the NSH packet to the next function in the SFC (step s1114).

The NSH23GPP Function

The NSH23GPP function 906 can be instantiated for uplink and downlink traffic. For uplink traffic (see, e.g., FIG. 9), the NHS23GPP function is located at the exit point of the RAN forwarding packets to the UPF. For downlink traffic (see, e.g., FIG. 10), The NSH23GPP function 906 is located at the exit point of the RAN forwarding packets to BPU.

Figure 12:
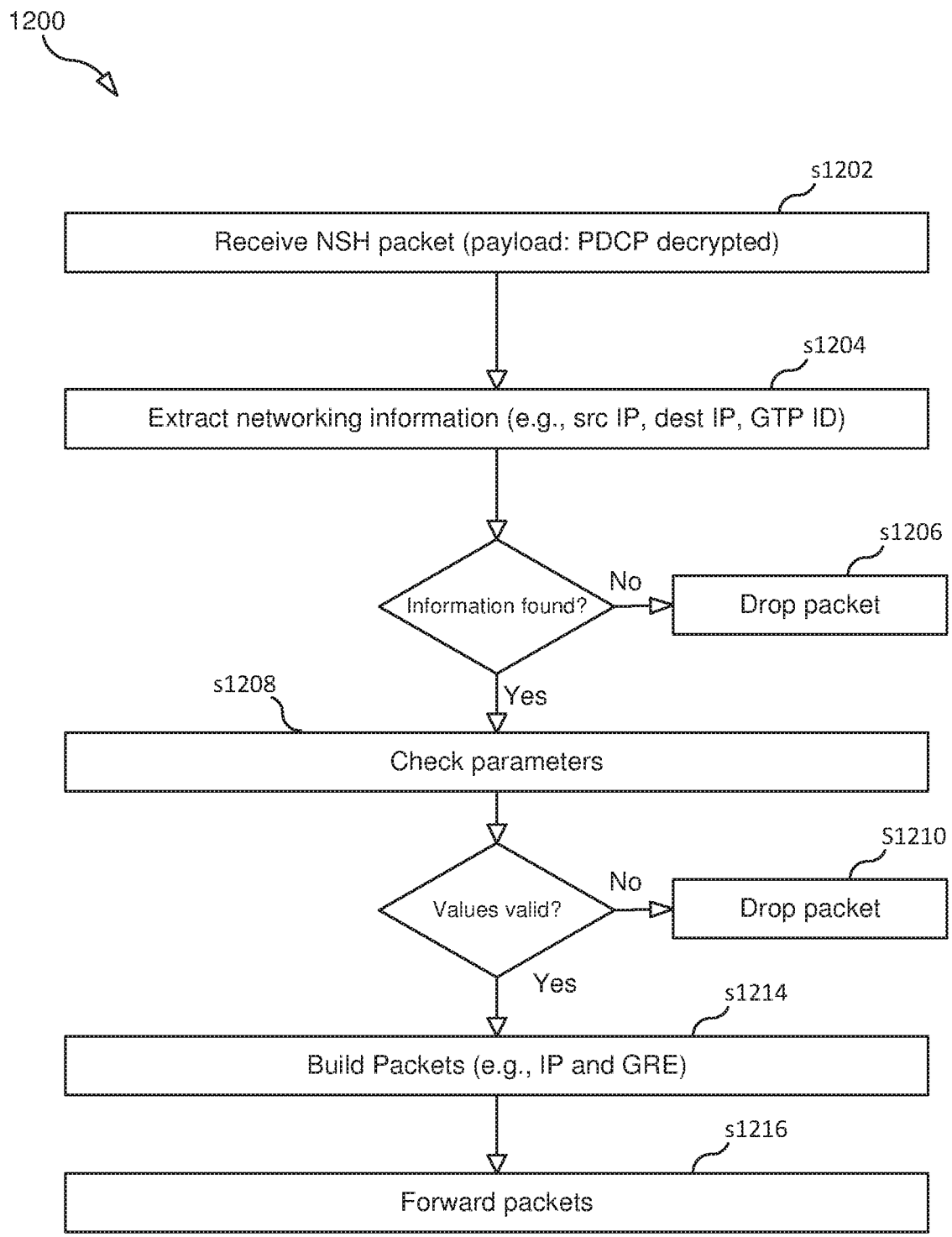
FIG. 12 is a flowchart illustrating a process according to some embodiments.

In one embodiment, NSH23GPP performs process 1200 (see FIG. 12).

In step s1202, NSH23GPP receives an NSH packet. Next, The NSH23GPP function 906 extracts the networking information (e.g., IP addresses, TEID, etc.) from the NSH header of the NSH packet (step s1204). For example, The NSH23GPP function 906 extracts from the metadata element of the NSH header the following pieces of information: the IP source that identifies BPU of the packet, the IP destination that identifies the RAN, and the GTP ID that identifies the tunnel. In case one of these pieces of information is not found, the packet may be dropped (step s1206). The remaining of the packet is the payload.

After extracting the networking information, the NSH23GPP function 906 validates the values of the extracted parameters (step s1208). That is, the function determines whether the values are expected values. If a value (e.g., IP source address) is different than an expected value for the parameter, then the packet may be dropped (step s1210). This validation is similar to the one performed by the 3GPP2NSH function. This validation step may not be needed if a check has been performed at the entry point and if the NSH data is authenticated.

Next, The NSH23GPP function 906 generates a 3GPP packet (e.g, a GTP-UP) packet as well as an IP packet to carry the 3GPP packet using the extracted networking information (step s1214). For example, in one embodiment, the extracted networking information is re-used. That is, for example, in an embodiment in which the networking information includes an IP destination address and a TEID, NSH23GPP generates an IP packet and a GTP-U packet, the extracted IP destination address is included in an IP destination address field of the IP header of the IP packet, and the TEID is included in a header of the GTP-U packet. After generating the 3GPP packet, the 3GPP packet is forwarded to the UPF (step s1216). More specfically, in the example given, the IP packet carrying the 3GPP packet is forwarded to the UPF.

The downlink stream works similarly, mirroring these transformations.

Implementation with NSH

NSH is a standard protocol for service chaining. In this embodiment, a new type of NSH metadata is defined. This new type of NSH metadata is used to carry the necessary information for the chain verification for each packet (e.g., it is used to carry the above described networking information). FIG. 13 shows the format of NSH optional variable-length (VL) metadata.

The Metadata Class (MD Class) field of the VL metadata defines the scope of the Type field to provide a hierarchical namespace. Section 9.1.4 of RFC 8300 defines how the MD Class values can be allocated to standards bodies, vendors, and others. The Type field indicates the explicit type of metadata being carried. The definition of the Type is the responsibility of the MD Class owner. The 1 bit U field is an unassigned bit that is available for future use. The Length field indicates the length of the variable-length metadata, in bytes. In case the metadata length is not an integer number of 4-byte words, the sender may add pad bytes immediately following the last metadata byte to extend the metadata to an integer number of 4-byte words. The length may be 0 or greater. A length value of 0 denotes a Context Header without a Variable-Length Metadata field.

This disclosure proposes defining a new MD Class—3GPP2NSH—to be registered with IANA. As described in RFC 8300, IANA has set up the "NSH MD Class" registry, which contains 16-bit values. New allocations are to be made according to the following policies: 1) 0x0000 to 0x01ff: IETF Review and 2) 0x0200 to 0xfff5: Expert Review. IANA has assigned the values as follows:

| Value | Meaning | Reference |
| --- | --- | --- |
| 0x0000 | IETF Base NSH MD Class | RFC 8300 |
| 0xfff6 to 0xfffe | Experimental | RFC 8300 |
| 0xffff | Reserved | RFC 8300 |

A registry for Types for the MD Class of 0x0000 is defined in Section 9.1.5 of RFC 8300. The following is an excerpt from section 9.1.4 of RFC 8300:

Designated Experts evaluating new allocation requests from the "Expert Review" range should principally consider whether a new MD class is needed compared to adding MD Types to an existing class. The Designated Experts should also encourage the existence of an associated and publicly visible registry of MD Types although this registry need not be maintained by IANA.

When evaluating a request for an allocation, the Expert should verify that the allocation plan includes considerations to handle privacy and security issues associated with the anticipated individual MD Types allocated within this class. These plans should consider, when appropriate, alternatives such as indirection, encryption, and limited-deployment scenarios. Information that can't be directly derived from viewing the packet contents should be examined for privacy and security implications.

NSH Metadata

Figure 14:
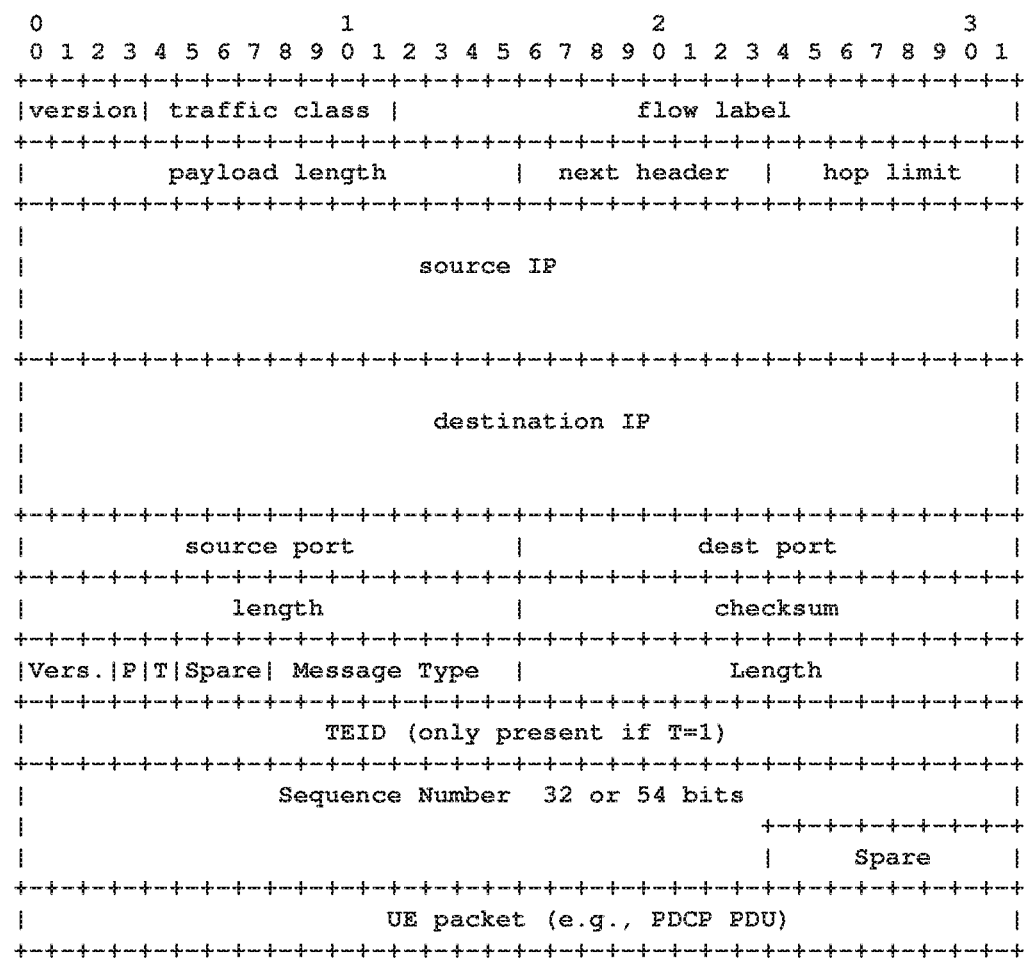
FIG. 14 shows a traditional IP packet.
Figure 15:
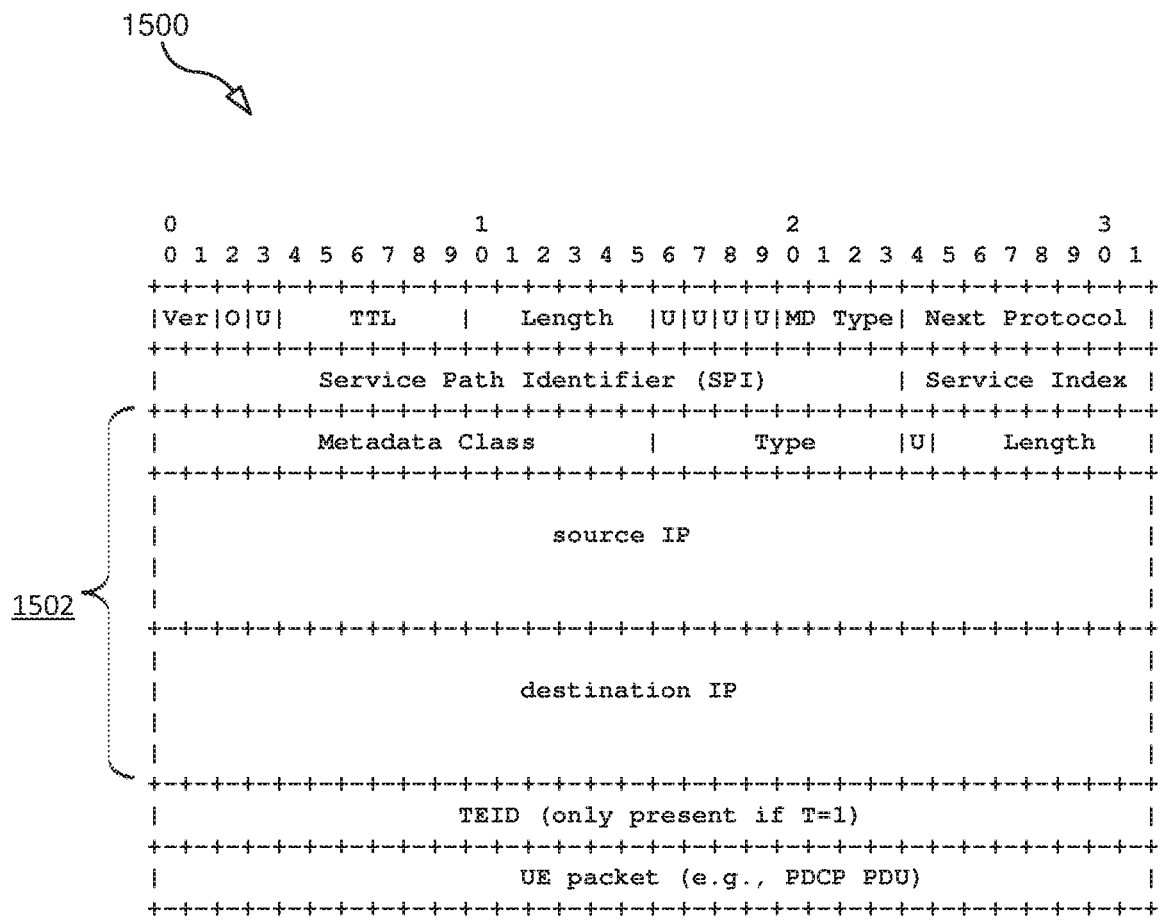
FIG. 15 shows an SFC packet according to an embodiment.
Figure 16:
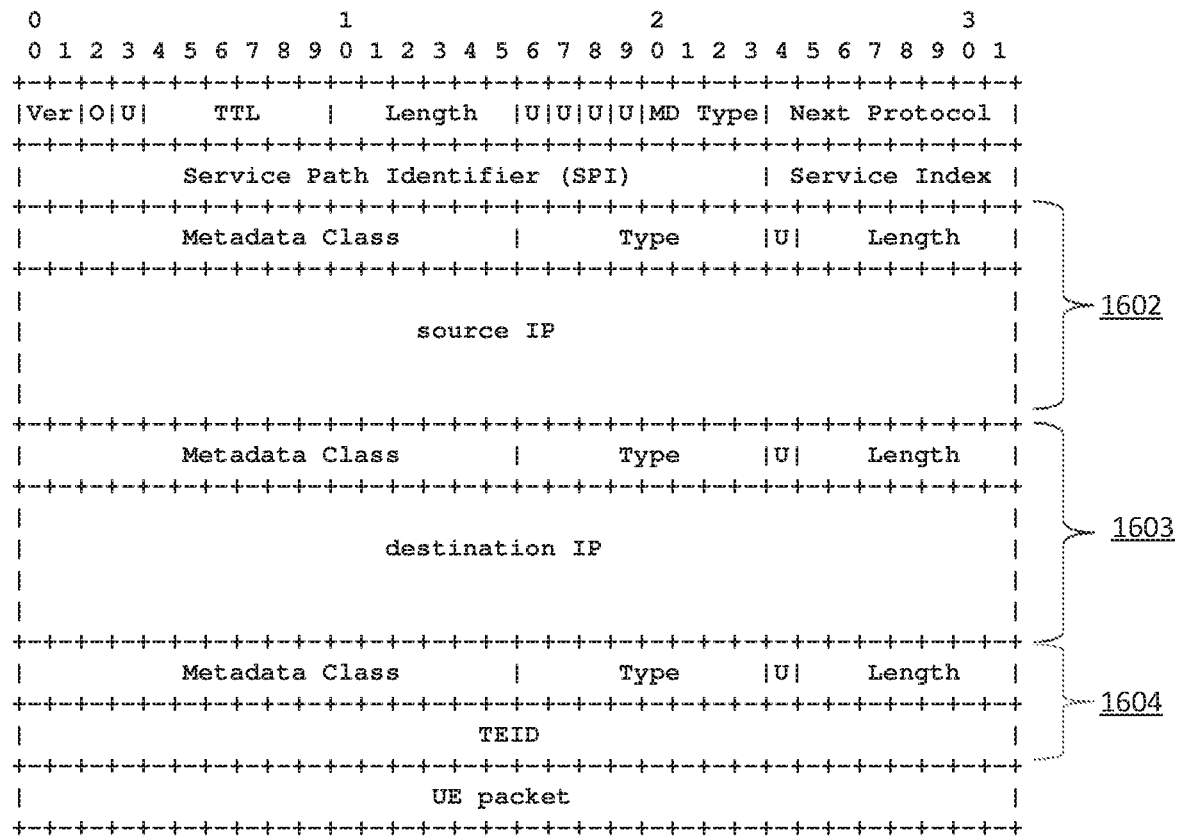
FIG. 16 shows an SFC packet according to an embodiment.

In one embodiment, The following new NSH metadata Types are defined:

IPv4_src: indicates the PDCP packet was sent with this IPv4 address as IP source. The length is 4 bytes
IPv4_dst: indicates the PDCP packet was sent with this IPv4 address as IP destination. The length is 4 bytes
IPv6_src: indicates the PDCP packet was sent with this IPv6 address as IP source. The length is 16 bytes
IPv6_dst: indicates the PDCP packet was sent withthis IPv6 address as IP destination. The length is 16 bytes
GTPID: the GTP tunnel -ID
3gpp4: indicates the PDCP packet was sent using IPv4, it contains both IP addresses as well as the TEID
3gpp6: indicates the PDCP packet was sent using IPv6, it contains both IP addresses as well as the TEID Virtual Packet FIG. 14 shows a traditional IP packet 1400 that encapsulates a UDP packet that encapsulates a GTP packet, and FIG. 15 shows one example of an NSH packet 1500 that is generated from packet 1400. Packet 1500 may be referred to as a virtualized IP packet. In the example shown in FIG. 15, the networking information is aggregated into one metadata element. More explicitly, in this example, there is one metadata element 1502 that contains the concatenation of: the source IP address; the destination IP address; and the TEID. In some embodiments, the networking information may further include a UE identifier (e.g., CNRTI) that identifies the UE. FIG. 16 shows another implementation each piece of networking information is contained within a separate metadata element. That is, FIG. 16 shows three metadata elements 1602, 1603, and 1604, wherein element 1602 contains the source IP address, element 1603, contains the destination IP address, and element 1604 contains the TEID.

Implementation in K8s

In the context of K8s, a straight-forward implementation would be to encapsulate each function in a container, resulting in 4 containers, Classifier, Translation, M2Key, PDCP E (D) respectively. In deployment, by instantiating at least one corresponding container instance, each function is deployed as a microservice with a unique service name (e.g., SVC_C, SVC_T, SVC_M, or SVC_P). In runtime, the number of container instance for each micro service can be scaled up and down independently. These micro services are orchestrated and serve as RAN service.

Figure 17:
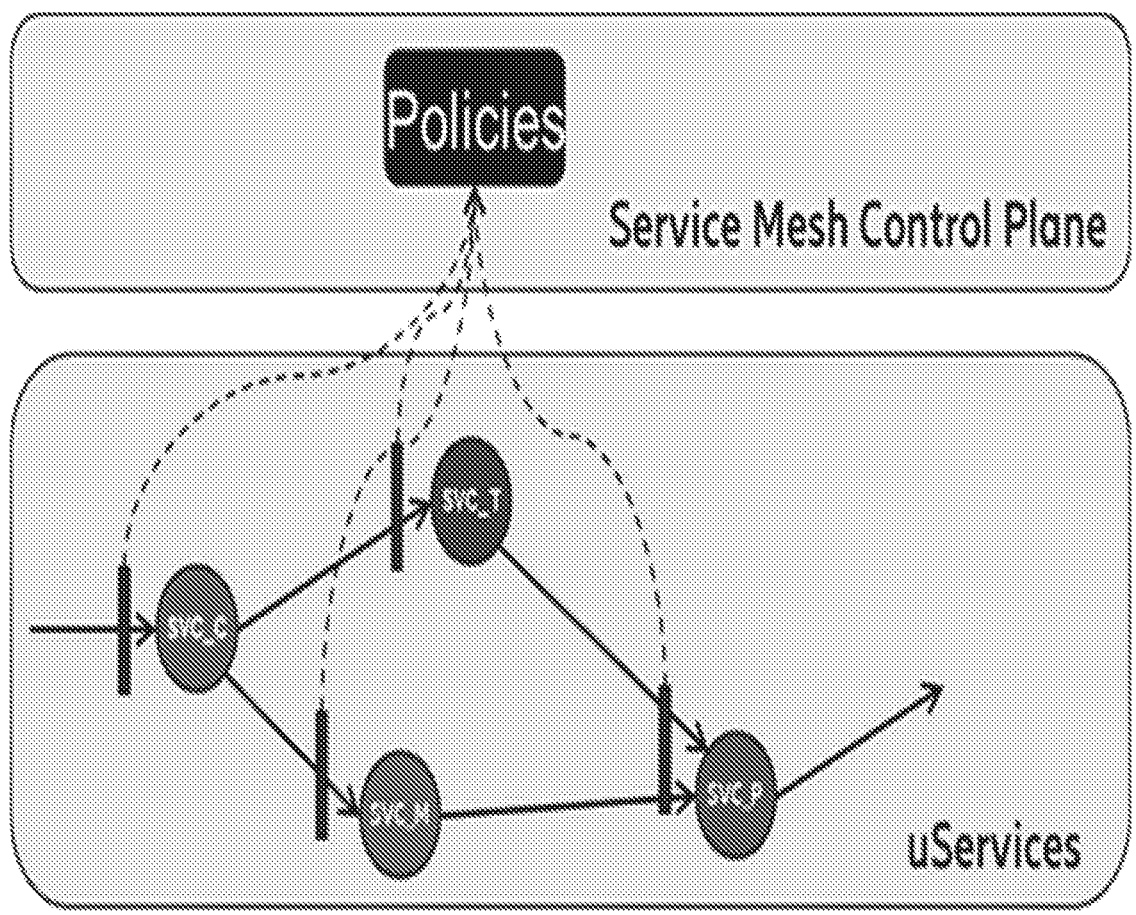
FIG. 17 illustrates a service mesh control plane.

For each micro service, upon reception of a request (with packet(s)), it will be passed to one of the corresponding container instance for packet processing. The result will be passed to the next service. The logics of routing request/ packet among these micro services can be implemented in two different ways: (1) it can be embedded in each service, for example, at the end of each function implementation, the next service which is expected to receive the output can be specified by giving the service name. (2) it can be isolated from the function implementation by adding an extra layer on top of the services. One potential solution is so-called service mesh. By adding a service mesh layer, the routing logics can be implemented in the mesh layer by enforcing policies, as shown in FIG. 17.

Figure 18:
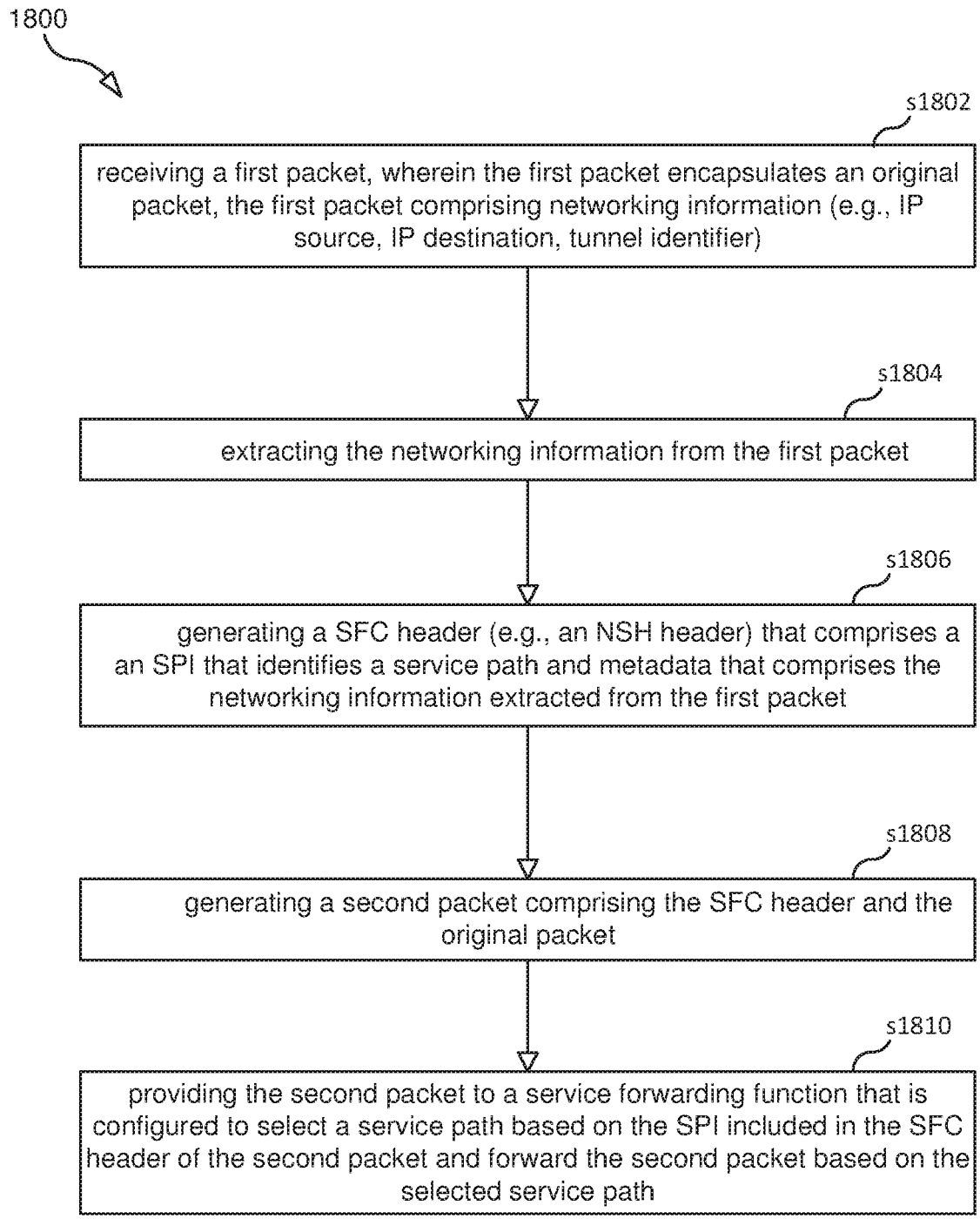
FIG. 18 is a flowchart illustrating a process according to some embodiments.

FIG. 18 is a flowchart illustrating a process 1800 according to an embodiment for steering an original packet transmitted by UE 102. Process 1800 may be performed by classifier 902 or 3GPP2NSH 904. Process 1800 may begin with step s1802.

Step s1802 comprises receiving a first packet, wherein the first packet encapsulates a packet transmitted by UE 102. The packet transmitted by UE 102 is called the "original" packet. The first packet comprises networking information (e.g., IP source, IP destination, tunnel identifier).

Step s1804 comprises extracting the networking information from the first packet. In some embodiments, the first packet comprises a TEID, and the extracted networking information comprises the TEID. In some embodiments, the first packet further comprises an IP header comprising a source IP address and a destination IP address, and the extracted networking information further comprises the source IP address and the destination IP address.

Step s1806 comprises generating an SFC header (e.g., an NSH header), wherein the SFC header comprises a service path identifier (SPI) that identifies a service path and metadata (e.g., one or more TLV metadata elements), wherein the metadata comprises the networking information extracted from the first packet.

Step s1808 comprises generating a second packet comprising the SFC header and the original packet.

Step s1810 comprises providing the second packet to a service forwarding function (SFF) (e.g., SFF 921 or 922) that is configured to select a service path based on the SPI included in the SFC header of the second packet and forward the second packet based on the selected service path.

In some embodiments process 1800 further includes receiving, at a key retrieving function (e.g., M2Key 908), the second packet; and using information contained in the second packet to retrieve a key or a key index. In some embodiments, the process 1800 further includes the key retrieving function generating a third packet that comprises: a) an SFC header comprising the networking information and the retrieved key or key identifier and b) the original packet; and forwarding the third packet to an encryption function (e.g., PDCP-D 910). In some embodiments, process 1800 further includes the encryption function receiving the third packet; the encryption function extracting the key or key identifier from the SFC header of the third packet; the encryption function using the key or the key identifier to decrypt the original packet, thereby creating a decrypted version of the original packet; and the encryption function providing to a second translation function (e.g., NSH23GPP 906) a fourth packet comprising: a) an SFC header containing the networking information and b) the decrypted version of the original packet. In some embodiments process 1800 further includes the second translation function generating an Internet Protocol, IP, packet comprising a payload comprising the decrypted version of the original packet; and the second translation function providing the IP packet to a UPF (e.g., UPF 306). In some embodiments, generating the IP packet comprises: determining an IP destination address based on at least part of the networking information; and generating an IP header comprising the determined IP destination address.

Figure 19:
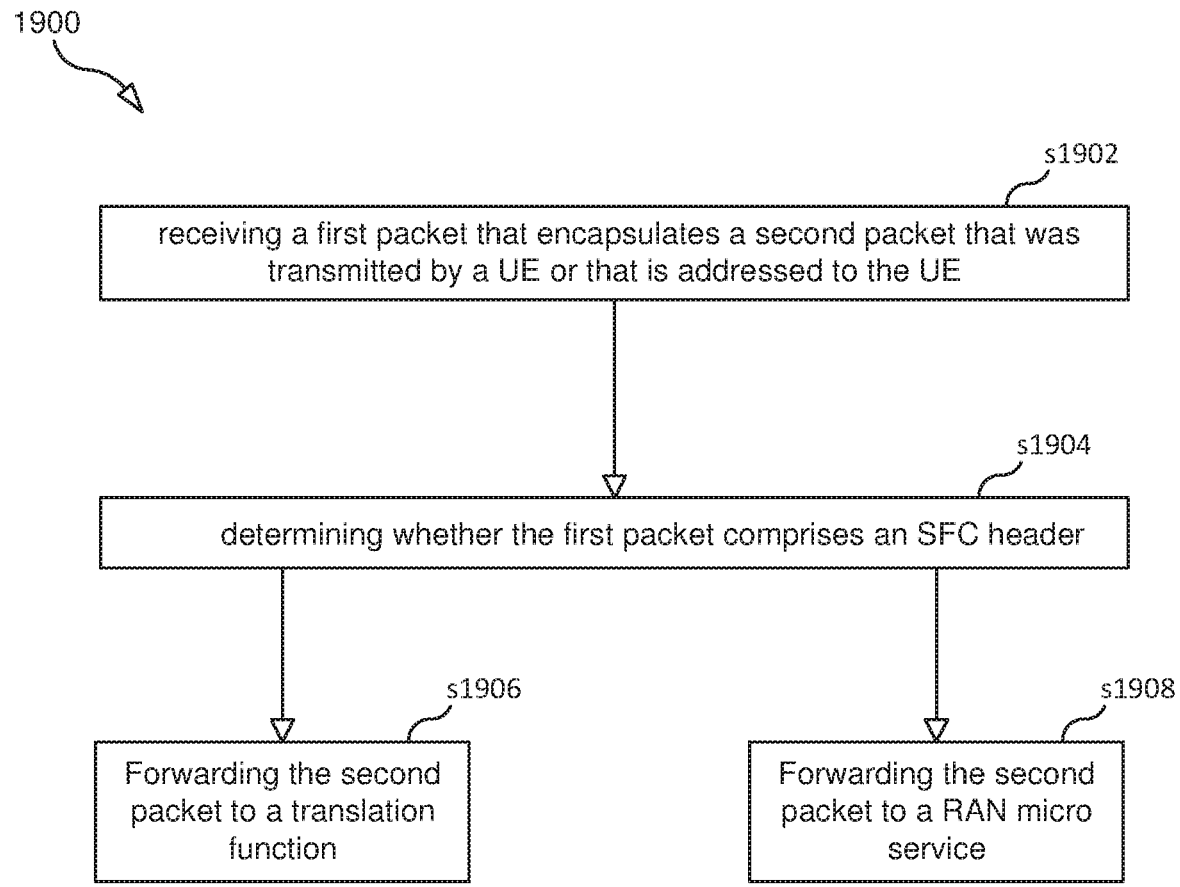
FIG. 19 is a flowchart illustrating a process according to some embodiments.

FIG. 19 is a flowchart illustrating a process 1900 according to an embodiment. Process 1900 is performed by classifier 902. Process 1900 may begin with step s1902. Step s1902 comprises the classifier receiving a first packet that encapsulates a second packet that was transmitted by UE 102 (or that is addressed to the UE 102). Step s1904 comprises the classifier determining whether the first packet comprises an SFC header. If the first packet does not comprise the SFC header, the classifier forwards the second packet to a translation function (e.g., 3GPP2NSH 904) (step s1906). And if the first packet comprises the SFC header, the classifier forwards the second packet to a RAN micro service (e.g., M2Key 908) (step s1908).

In some embodiments, the classifier forwards the second packet to the translation function as a result of determining that the first packet does not comprise the SFC header and the first packet has passed a verification check.

In some embodiments, forwarding the second packet to the translation function comprises providing to the translation function the received first packet, which contains the second packet. In other embodiments, forwarding the second packet to the translation function comprises providing to the translation function a third packet that encapsulates the second packet, wherein the third packet comprises an SFC header.

Figure 20:
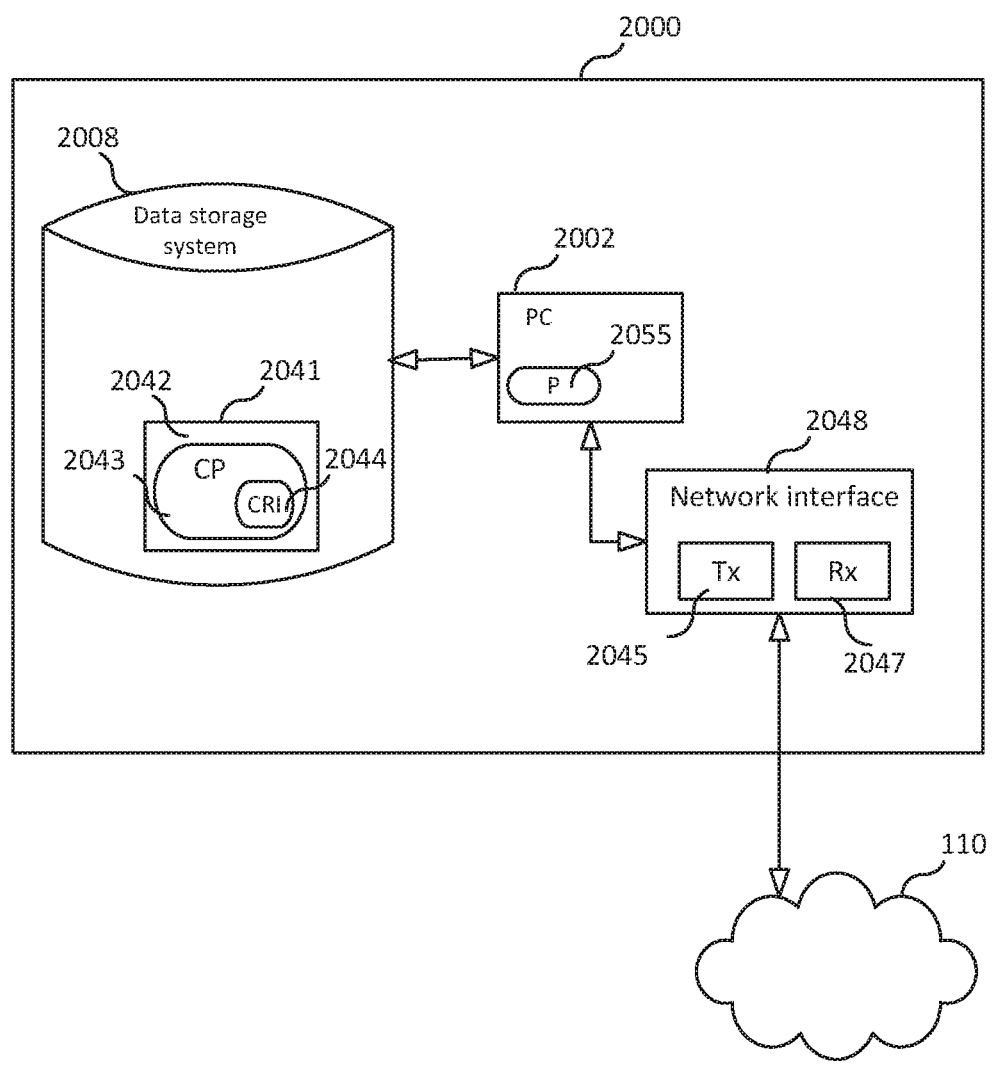
FIG. 20 illustrates a network node according to some embodiments.

FIG. 20 is a block diagram of an apparatus 2000, according to some embodiments, for performing the methods disclosed herein. As shown in FIG. 20, apparatus 2000 may comprise: processing circuitry (PC) 2002, which may include one or more processors (P) 2055 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed (i.e., apparatus 2000 may be a distributed computing apparatus); at least one network interface 2048 comprising a transmitter (Tx) 2045 and a receiver (Rx) 2047 for enabling apparatus 2000 to transmit data to and receive data from other nodes connected to a network 110 (e.g., an Internet Protocol (IP) network) to which network interface 2048 is connected (directly or indirectly) (e.g., network interface 2048 may be wirelessly connected to the network 110, in which case network interface 2048 is connected to an antenna arrangement); and a storage unit (a.k.a., "data storage system") 2008, which may include one or more non-volatile storage devices and/or one or more volatile storage devices. In embodiments where PC 2002 includes a programmable processor, a computer program product (CPP) 2041 may be provided. CPP 2041 includes a computer readable medium (CRM) 2042 storing a computer program (CP) 2043 comprising computer readable instructions (CRI) 2044. CRM 2042 may be a non-transitory computer readable medium, such as, magnetic media (e.g., a hard disk), optical media, memory devices (e.g., random access memory, flash memory), and the like. In some embodiments, the CRI 2044 of computer program 2043 is configured such that when executed by PC 2002, the CRI causes apparatus 2000 to perform steps described herein (e.g., steps described herein with reference to the flow charts). In other embodiments, apparatus 2000 may be configured to perform steps described herein without the need for code. That is, for example, PC 2002 may consist merely of one or more ASICs. Hence, the features of the embodiments described herein may be implemented in hardware and/or software.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for steering an original packet transmitted by a user equipment (UE), the method comprising:
   receiving a first packet, the first packet encapsulating the original packet, the first packet comprising networking information;
   extracting the networking information from the first packet;
   generating a service function chaining (SFC) header, the SFC header comprising a service path identifier (SPI) that identifies a service path and metadata, the metadata comprising the networking information extracted from the first packet;
   generating a second packet comprising the SFC header and the original packet;
   receiving, at a key retrieving function, the second packet;
   using information contained in the second packet to retrieve a key or a key index, the key retrieving function generating a third packet that comprises: a) an SFC header comprising the networking information and the retrieved key or key identifier and b) the original packet;
   forwarding the third packet to an encryption function;
   the encryption function receiving the third packet;
   the encryption function extracting the key or key identifier from the SFC header of the third packet;
   the encryption function using the key or the key identifier to decrypt the original packet, thereby creating a decrypted version of the original packet;
   the encryption function providing to a second translation function a fourth packet comprising: a) an SFC header containing the networking information and b) the decrypted version of the original packet;

the second translation function generating an Internet Protocol, IP, packet comprising a payload comprising the decrypted version of the original packet;

the second translation function providing the IP packet to a user plane function, UPF of a core network; and providing the second packet to a service forwarding function (SFF) that is configured to select a service path based on the SPI included in the SFC header of the second packet and forward the second packet based on the selected service path.

2. The method of claim 1, wherein
the first packet comprises a tunneling protocol header comprising a tunnel endpoint identifier (TEID), and
the extracted networking information comprises the TEID.

3. The method of claim 1, wherein
the first packet further comprises an Internet Protocol (IP) header comprising a source IP address and a destination IP address, and
the extracted networking information further comprises the source IP address and the destination IP address.

4. A non-transitory computer readable storage medium storing a computer program comprising instructions which when executed by processing circuitry of an apparatus causes the apparatus to:

receive a first packet, wherein the first packet encapsulates the original packet, the first packet comprising networking information;

extract the networking information from the first packet;

generate a service function chaining (SFC) header, the SFC header comprising a service path identifier (SPI) that identifies a service path and metadata, the metadata comprising the networking information extracted from the first packet;

generate a second packet comprising the SFC header and the original packet;

receive, at a key retrieving function, the second packet;

use information contained in the second packet to retrieve a key or a key index, the key retrieving function generating a third packet that comprises: a) an SFC header comprising the networking information and the retrieved key or key identifier and b) the original packet;

forward the third packet to an encryption function;

the encryption function receiving the third packet;

the encryption function extracting the key or key identifier from the SFC header of the third packet;

the encryption function using the key or the key identifier to decrypt the original packet, thereby creating a decrypted version of the original packet;

the encryption function providing to a second translation function a fourth packet comprising: a) an SFC header containing the networking information and b) the decrypted version of the original packet;

the second translation function generating an Internet Protocol, IP, packet comprising a payload comprising the decrypted version of the original packet;

the second translation function providing the IP packet to a user plane function, UPF of a core network; and provide the second packet to a service forwarding function (SFF) that is configured to select a service path based on the SPI included in the SFC header of the second packet and forward the second packet based on the selected service path.

5. The method of claim 1, wherein generating the IP packet comprises:
determining an IP destination address based on at least part of the networking information; and
generating an IP header comprising the determined IP destination address.

6. An apparatus, the apparatus comprising:
processing circuitry; and
a memory, the memory containing instructions executable by the processing circuitry, the apparatus being operative to perform a process comprising:

receiving a first packet, the first packet encapsulating the original packet, the first packet comprising networking information;

extracting the networking information from the first packet;

generating a service function chaining (SFC) header, the SFC header comprising a service path identifier (SPI) that identifies a service path and metadata, the metadata comprising the networking information extracted from the first packet;

generating a second packet comprising the SFC header and the original packet;

receiving, at a key retrieving function, the second packet;

using information contained in the second packet to retrieve a key or a key index, the key retrieving function generating a third packet that comprises: a) an SFC header comprising the networking information and the retrieved key or key identifier and b) the original packet;

forwarding the third packet to an encryption function;

the encryption function receiving the third packet;

the encryption function extracting the key or key identifier from the SFC header of the third packet;

the encryption function using the key or the key identifier to decrypt the original packet, thereby creating a decrypted version of the original packet;

the encryption function providing to a second translation function a fourth packet comprising: a) an SFC header containing the networking information and b) the decrypted version of the original packet;

the second translation function generating an Internet Protocol, IP, packet comprising a payload comprising the decrypted version of the original packet;

the second translation function providing the IP packet to a user plane function, UPF of a core network; and providing the second packet to a service forwarding function (SFF) that is configured to select a service path based on the SPI included in the SFC header of the second packet and forward the second packet based on the selected service path.

7. The apparatus of claim 6, wherein
the first packet comprises a tunneling protocol header comprising a tunnel endpoint identifier (TEID), and
the extracted networking information comprises the TEID.

8. The apparatus of claim 6, wherein
the first packet further comprises an Internet Protocol (IP) header comprising a source IP address and a destination IP address, and
the extracted networking information further comprises the source IP address and the destination IP address.

* * * * *